(12) United States Patent
Novello

(10) Patent No.: US 10,069,358 B2
(45) Date of Patent: Sep. 4, 2018

(54) ROTOR OF ELECTRIC MOTOR WITH PERMANENT MAGNETS

(71) Applicant: LAFERT S.P.A., San Dona' di Piave (IT)

(72) Inventor: Andrea Novello, Musile di Piave (IT)

(73) Assignee: LAFERT S.P.A., San Dona'di Piave (IT)

( * ) Notice: Subject to any disclaimer, the term of this patent is extended or adjusted under 35 U.S.C. 154(b) by 218 days.

(21) Appl. No.: 14/872,520

(22) Filed: Oct. 1, 2015

(65) Prior Publication Data
US 2016/0099620 A1    Apr. 7, 2016

(30) Foreign Application Priority Data
Oct. 6, 2014  (IT) .............. PD2014A0257

(51) Int. Cl.
*H02K 21/12*    (2006.01)
*H02K 1/27*     (2006.01)

(52) U.S. Cl.
CPC ....... *H02K 1/2773* (2013.01); *H02K 2201/06* (2013.01)

(58) Field of Classification Search
CPC ................... H02K 1/27; H02K 21/12
USPC ............. 310/156.47, 156.53, 156.56, 156.48
See application file for complete search history.

(56) References Cited

U.S. PATENT DOCUMENTS

| 6,967,424 B2 * | 11/2005 | Popov ................ H02K 1/146 310/156.53 |
| 2013/0119808 A1 | 5/2013 | Hirokawa et al. |
| 2014/0084734 A1 * | 3/2014 | Ishigami .............. H02K 1/24 310/156.48 |

FOREIGN PATENT DOCUMENTS

| DE | 102012207243 A1 | 11/2013 |
| JP | 08223832 A * | 8/1996 |
| JP | 2009050099 A * | 3/2009 |

* cited by examiner

*Primary Examiner* — Jose Gonzalez Quinone
(74) *Attorney, Agent, or Firm* — Cantor Colburn LLP

(57) ABSTRACT

A rotor of an electric motor with permanent magnets includes a pack of laminations made of ferromagnetic material with slots for the permanent magnets which are arranged radially with respect to the rotation axis and are extended parallel thereto. The permanent magnets are magnetized along a direction that is perpendicular to the radius of the rotor. Each lamination of the lamination pack further includes poles between the permanent magnets that are rotated in a given direction and by a given angle with respect to the corresponding poles of the adjacent laminations.

2 Claims, 3 Drawing Sheets

ROTOR OF ELECTRIC MOTOR WITH PERMANENT MAGNETS

FIELD

The present disclosure relates to a rotor of an electric motor with permanent magnets.

BACKGROUND

Nowadays international regulations and laws of individual countries require increasingly high levels of energy efficiency increasingly for electric motors.

Among the several types of electric motors, the highest yields are obtained with permanent-magnet motors.

Usually permanent-magnet electric motors, synchronous or brushless, comprise a rotor, in which are arranged the permanent magnets, a stator, in the slots of which a three-phase winding is accommodated, and an electronic converter.

Thanks to this technology it is possible to obtain levels of yield of the motor which fall under class IE4 of the IEC standard, which is currently the highest class.

In the past, permanent-magnet motors were widely used in industrial drives which require high levels of dynamic performance and reduced space occupation. Today, however, their use is also spreading to sectors that are currently dominated by the asynchronous motor, such as the sector of pumps and fans.

However, the noise and the mechanical vibrations that they generate are non-negligible aspects in residential and commercial contexts, where acoustic comfort is an essential requirement.

Another non-negligible drawback of this type of motor is their relatively high cost. This is due to the fact that, presently, the permanent magnets used are made with alloys based on rare earth elements, such as neodymium, dysprosium and samarium.

These alloys are characterized by excellent residual induction and by considerable intrinsic coercive force, characteristics which ensure a high flow and a considerable resistance to demagnetization, with a relatively low volume of material, giving the motor high performance levels with reduced space occupancy.

However, their use is discouraged by the high price, which is unstable over time, and in recent years has increased significantly.

Conventionally, rare earth elements can be substituted with ferrite, the price of which markedly lower and more stable over time, given its high availability.

However, nowadays, with ferrite it is not possible to obtain the same levels of performance that can be obtained with rare earth elements. In fact, the maximum values of residual induction and intrinsic coercive force that can be obtained with ferrite are substantially equal to one third of the values that can be obtained with magnets that use rare earth elements. In order to achieve the same performance levels it is necessary to accommodate a greater volume of magnet.

In the most common configuration of permanent-magnet motors, the magnets are glued onto the surface of the rotor according to the SPM ("Surface-mounted Permanent Magnet") configuration.

Another possible configuration is one in which the magnets are accommodated inside the rotor in adapted slots, according to the IPM ("Interior Permanent Magnet") configuration. In this case the magnets can be arranged radially in the rotor, with the direction of magnetization being perpendicular to the radius.

IPM configurations make it possible to accommodate a greater volume of magnet than SPM configurations, thus favoring the use of ferrite.

With IPM motors it is therefore possible to contain costs; however, in order to fully exploit the potential in terms of motor torque, it is often necessary to equip the microprocessor of the electronic converter with a different control algorithm to the one usually used for SPM configurations. Such algorithm is in general more complex as well, since it has to take into account the variation of inductance levels with the current, and it should furthermore be calibrated to the motor: this has made standardization of the algorithms difficult owing to the great many possible types of IPM and as a consequence it has impeded the large-scale commercial spread of IPM drives.

Furthermore, the IPM rotor configuration has, usually with respect to the SPM solution, a higher moment of inertia, a higher inductance, more uneven torque as a function of time, and a nonlinear torque-current progression.

For the above mentioned reasons, the rotor configuration of the SPM type is often preferred to the IPM configuration in industrial automation applications.

In residential and commercial contexts on the other hand it is often the noise of the IPM configuration, which tends to be more pronounced than an SPM configuration, that discourages its use. Noise and mechanical vibrations of an electric motor are aspects that should not be underestimated, especially in residential and commercial contexts, where acoustic comfort is essential.

Furthermore, in order to facilitate the penetration of a different type of electric motor in market sectors that nowadays are occupied by other types of electric motors, it is necessary that it be offered at a competitive price.

SUMMARY

The aim of the present disclosure is to provide a rotor of an electric motor with permanent magnets, which are inside the rotor, which is capable of ensuring superior conditions of acoustic comfort to those of conventional motors of the same type, by reducing noise and vibrations as far as possible.

Within this aim, an object of the disclosure is to provide a rotor of an electric motor with permanent magnets thanks to which it is possible to significantly contain the overall cost of the motor.

Another object of the disclosure is to provide a rotor by way of industrial processes that are known and consolidated, in order to reduce the costs and also the time necessary to bring the product to market.

Another object of the disclosure is to provide a rotor for which it is possible to use, for driving the motor, the same control algorithms as for the permanent-magnet motors currently present on the market.

This aim and these and other objects which will become better apparent hereinafter are achieved by a rotor of an electric motor with permanent magnets, which comprises a pack of laminations made of ferromagnetic material with slots for said permanent magnets which are arranged radially with respect to the rotation axis and are extended parallel thereto, said rotor being characterized in that said permanent magnets are magnetized along a direction that is perpendicular to a radius of said rotor and each lamination of said lamination pack has poles, between said permanent magnets, which are rotated in a given direction and by a given angle with respect to corresponding poles of the adjacent laminations.

BRIEF DESCRIPTION OF THE FIGURES

Further characteristics and advantages of the disclosure will become better apparent from the description of a preferred, but not exclusive, embodiment of the rotor according to the disclosure, which is illustrated by way of non-limiting example in the accompanying drawings wherein.

DETAILED DESCRIPTION OF THE FIGURES

Figure 1:
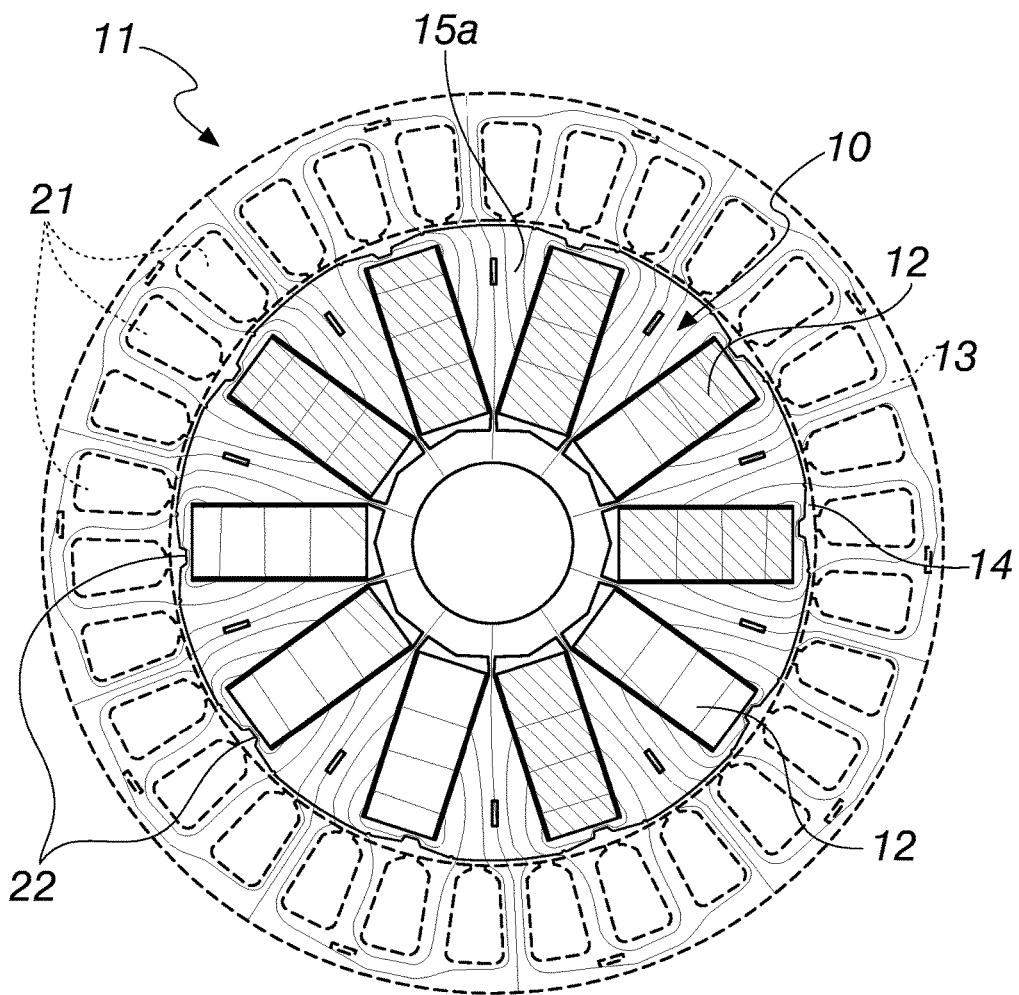
FIG. 1 is a cross-sectional view of an electric motor, with a rotor according to the disclosure, taken along a given lamination of the rotor and showing the concatenated flow lines at a moment in time of the operation of the motor.
Figure 2:
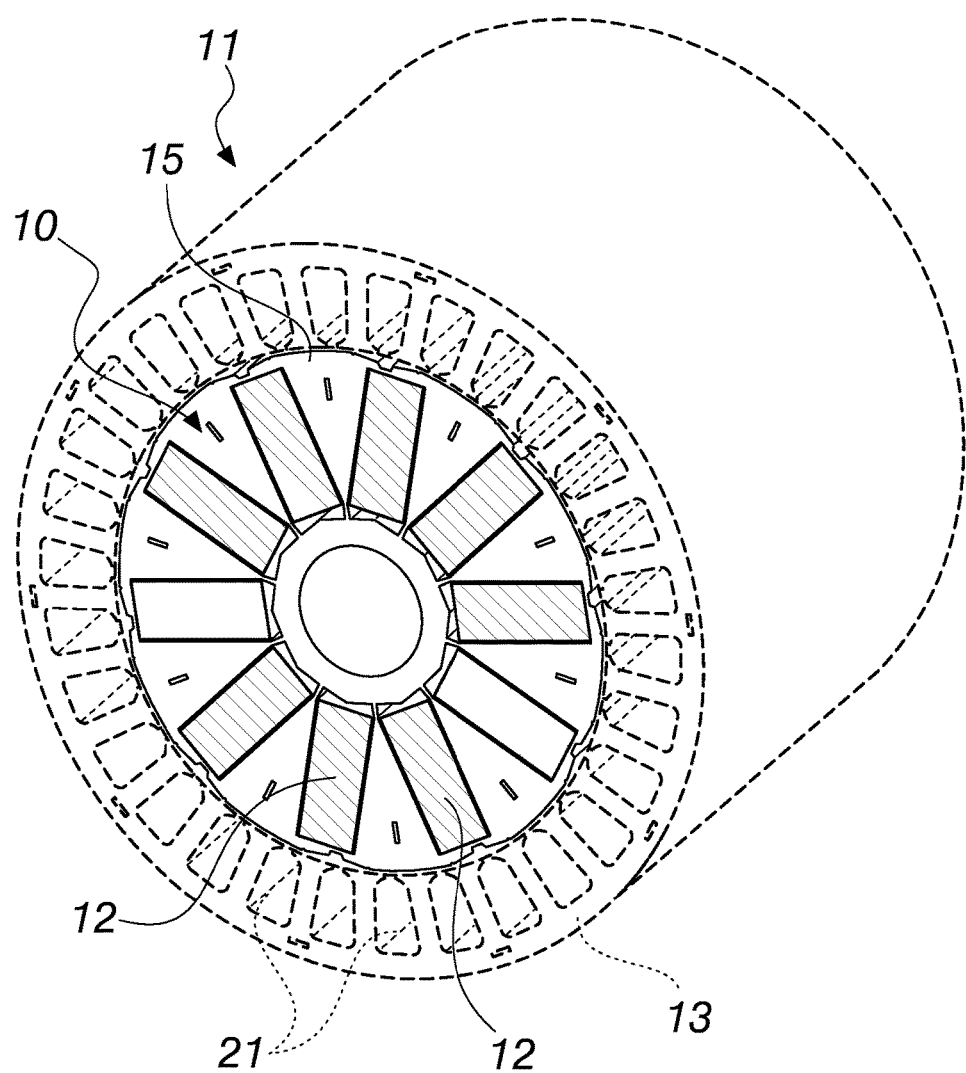
FIG. 2 is a perspective view of a permanent-magnet electric motor with a rotor according to the disclosure.

With reference to the figures, the rotor according to the disclosure is generally designated with the reference numeral 10.

FIG. 1 shows a cross-section of an electric motor 11 provided with the rotor 10, with permanent magnets 12 inside the latter.

The rotor 10 is inserted, as is usual, in a stator 13, from which it is spaced apart by a magnetic gap 14.

The rotor 10 comprises a pack of laminations 15 made of ferromagnetic material, each of the laminations 15a being obtained by punching sheet metal.

Figure 4:
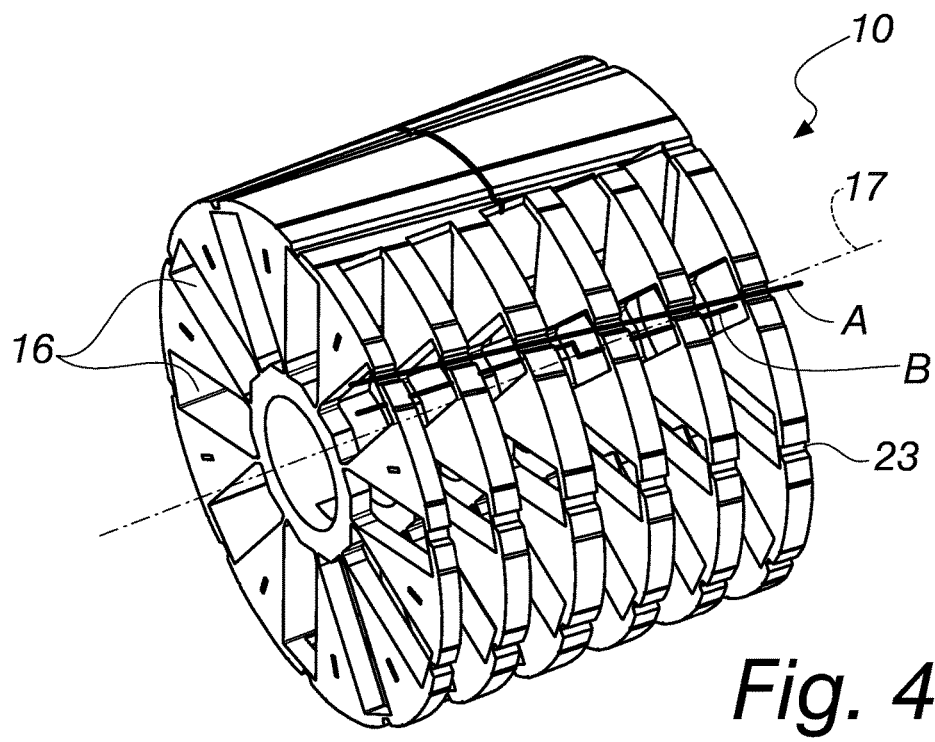
FIG. 4 is another perspective view of the rotor according to the disclosure, deprived of some parts in order to make certain details more visible.

The lamination pack 15 is provided with slots 16, clearly visible in FIG. 4, for the permanent magnets 12, which are arranged radially with respect to a rotation axis 17 and are extended in a direction parallel thereto.

The permanent magnets 12 are advantageously parallelepiped-shaped and are obtained by way of sintering. They are in fact inserted in the slots 16 according to the axial direction of the rotor 10 and are positioned radially in the lamination pack 15, with the direction of magnetization being perpendicular to the radius of the rotor 10.

The permanent magnets 12 are retained in position by the pack of laminations 15, which for this reason have bridges 18 which connect different poles 19 of the rotor 10 together, at the outermost part thereof, and internally a crown 20, which is also made of ferromagnetic material, by way of which the lamination pack 15 can be mounted on a rotary transmission shaft.

In the example shown, the rotor 10 is dimensioned with ten poles 19 in order to be associated with a stator 13 with thirty stator slots 21 for the electrical windings.

Each lamination 15a has the poles 19, between the permanent magnets 12, advantageously rotated in a given direction and by a given angle with respect to the corresponding poles 19 of the adjacent laminations 15a.

Figure 3:
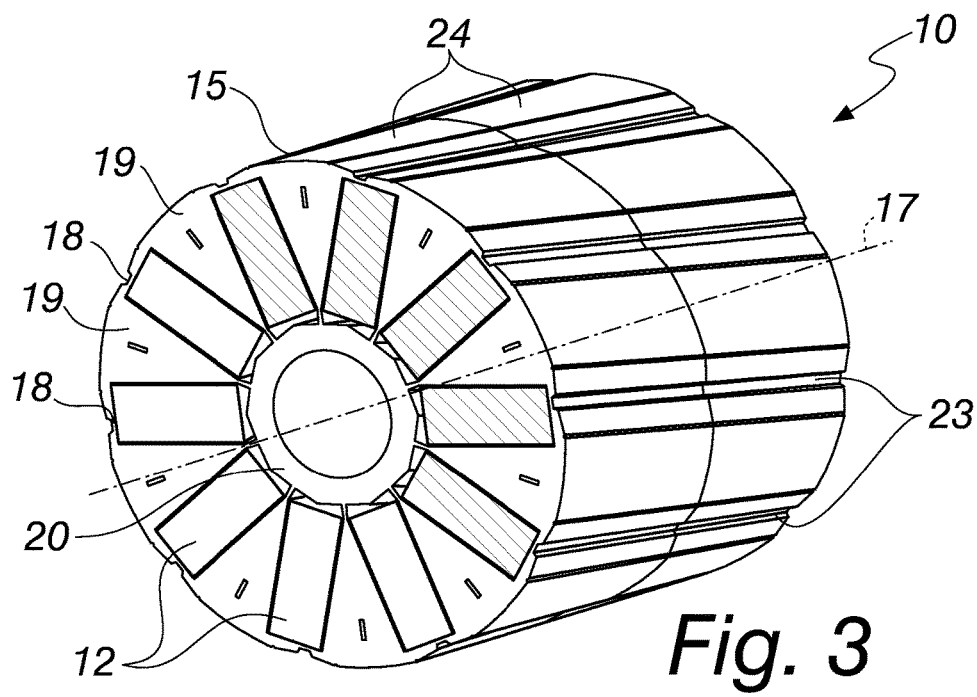
FIG. 3 is the same perspective view as FIG. 2, showing the rotor according to the disclosure.

This can be understood from observing FIGS. 3 and 4. Each one of the laminations 15a is provided with recesses 22 at its external peripheral region in a position that is rotated about the rotation axis 17 with respect to similar recesses 22 of the adjacent laminations 15a and which constitute, in series with the recesses 22 of the other laminations 15a, grooves 23 along the external peripheral region of the rotor 10. The grooves 23 are equidistant and are parallel to each other and are inclined with respect to the rotation axis 17.

FIG. 4 shows a part of a rotor 10 according to the disclosure, in particular the lamination pack 15 deprived of some of its parts in order to render the relative position between the grooves 23 and the slots 16 clearly visible. In particular in such figure, a portion of some packs of laminations is not shown.

It can be seen that the lamination pack 15 comprises two consecutive and coaxial portions 24, the respective slots 16 of which for the permanent magnets 12 are rotated with respect to each other about the rotation axis 17.

The slots 16 of each one of the two consecutive and coaxial portions 24 extend in the direction of the rotation axis 17, they being contoured to accommodate the permanent magnets 12, which as described are parallelepiped-shaped.

The grooves 23, which are inclined with respect to the rotation axis 17, extend along the external peripheral region of the rotor 10, from one end to the opposite end at the slots 16 of the two consecutive and coaxial portions 24.

FIG. 4 also shows a first, continuous line A which shows the direction of the grooves 23 on the external peripheral region of the rotor 10, and a second line B which shows with its two parallel portions the direction of extension of the slots 16 in the two consecutive and coaxial portions 24.

FIG. 1 shows, in cross-section, the electric motor 11 during its operation and the concatenated magnetic flow lines can clearly be seen.

Operation of the rotor, according to the disclosure, is the following.

As shown in FIG. 1, following the activation of the electric motor 11, the magnetic flow of the rotor 10 is gathered and concatenated toward the magnetic gap 14, through the poles 19 of the lamination pack 15.

It is further conveyed toward the grooves 23, following their inclination with respect to the rotation axis 17 of the rotor 10.

In this manner the stator 13 sees the rotating magnetic field produced by the rotor 10 gradually increase, and this brings advantages in terms of reduction of flow harmonics, which are the principal cause of vibrations and of noise in this type of electric motors.

Thanks to the relative rotation of the slots 16 of the two consecutive and coaxial portions 24, it is possible to design the rotor 10 with inclined grooves 23 without the slots 16 and the permanent magnets 12 also being correspondingly inclined. This makes it possible to obtain several results, i.e. to make and use parallelepiped-shaped permanent magnets 12, which can easily be inserted in the lamination pack 15 (from opposite faces of the rotor 10 and in the axial direction) and can be made by way of sintering, in a simple manner and keeping production costs low, and makes it possible to have the recesses 22 of the individual laminations, which in series recreate the grooves 23, fall at the permanent magnets 12, thus preventing the magnetic flow from dispersing in the vicinity of the external peripheral region.

The particular rotor configuration shown and described makes it possible to achieve a high yield and a high power factor while at the same time limiting the noise and mechanical vibrations, thanks to the rotation of the poles 19 between one lamination 15a and the adjacent one, which can clearly be seen from the particular contouring of the external profile.

It should be noted that being able to use parallelepiped-shaped permanent magnets makes it possible to take advantage of conventional and low cost manufacturing technologies, thus containing investments, and also to bring the product to market in a relatively short time.

Furthermore it should be noted that the rotor according to the disclosure makes it possible to provide an electric motor in the IPM configuration with performance levels similar to those of the current state of the art of motors in the SPM configuration, using magnets based on ferrite, or other, equivalent materials, instead of materials based on rare earth elements, which are more expensive and the price of which is unstable. Alternatively, it makes it possible to obtain a higher yield and a higher torque density if magnets based on rare earth elements are used.

Also, it should be noted that the rotor according to the disclosure can be dimensioned so as to minimize inductance and magnetic anisotropy, in so doing enabling the use of algorithms for controlling synchronous SPM motors.

In practice it has been found that the disclosure fully achieves the intended aim and objects, by providing a rotor of an electric motor with permanent magnets which is capable of ensuring a relatively high energy yield, while at the same time reducing noise, vibrations and the overall costs of the electric motor in which it is mounted so that this can be used for, in addition to industrial applications, residential and commercial applications as well.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. PD2014A000257 (102014902298691) from which this application claims priority are incorporated herein by reference.

What is claimed is:

1. A rotor of an electric motor with permanent magnets, the rotor comprises a pack of laminations made of ferromagnetic material with a plurality of slots for said permanent magnets, said permanent magnets being arranged radially with respect to a rotation axis and extended parallel to said rotation axis, wherein said permanent magnets are magnetized along a direction that is perpendicular to a radius of said rotor, and each lamination includes poles, disposed between said permanent magnets, wherein the poles are rotated in a first direction and by a first angle with respect to corresponding poles of the adjacent laminations, wherein said lamination pack includes two consecutive and coaxial portions, wherein the respective slots upon which said permanent magnets are rotated with respect to each other about said rotation axis, and wherein each of said laminations includes recesses at its external peripheral region in a position that is rotated about said rotation axis with respect to similar recesses of the adjacent laminations and which constitute, in series with the recesses of the other laminations, a plurality of grooves along the external peripheral region of said rotor, wherein the grooves are equidistant and parallel to each other and inclined with respect to said rotation axis.

2. The rotor according to claim 1, wherein the slots are extended in the direction of the rotation axis and are shaped to receive said permanent magnets, which are substantially parallelepiped-shaped.

\* \* \* \* \*